US006276202B1

(12) United States Patent
Latarius

(10) Patent No.: US 6,276,202 B1
(45) Date of Patent: Aug. 21, 2001

(54) DEVICE AND METHOD FOR DETECTING SNOW AND ICE

(75) Inventor: Hans Latarius, Essen (DE)

(73) Assignee: Tekmar GmbH, Essen (DE)

( * ) Notice: Subject to any disclaimer, the term of this patent is extended or adjusted under 35 U.S.C. 154(b) by 0 days.

(21) Appl. No.: 09/381,587

(22) PCT Filed: Feb. 25, 1998

(86) PCT No.: PCT/EP98/01055

§ 371 Date: Sep. 20, 1999

§ 102(e) Date: Sep. 20, 1999

(87) PCT Pub. No.: WO98/41958

PCT Pub. Date: Sep. 24, 1998

(30) Foreign Application Priority Data

Mar. 19, 1997 (DE) .............................................. 197 11 371

(51) Int. Cl.[7] .......................... G01N 27/04; G01W 1/02; F25D 21/00; G05D 22/02

(52) U.S. Cl. .................................... 73/335.05; 73/335.02; 73/25.04

(58) Field of Search ........................... 73/335.03, 335.05, 73/335.02, 29.01, 25.04, 170.26

(56) References Cited

U.S. PATENT DOCUMENTS 3,276,254 * 10/1966 Richard .................................. 73/170
3,926,052 * 12/1975 Bechtel ................................ 73/336.5
4,261,179 * 4/1981 Dageford ................................ 62/150
4,326,414 * 4/1982 Terada ................................. 73/336.5
4,419,021 * 12/1983 Terada et al. ......................... 374/101
4,419,888 * 12/1983 Kitamura et al. .................... 73/336.5
4,768,378 * 9/1988 Ando et al. .......................... 73/336.5
4,893,508 * 1/1990 Friedman ............................ 73/336.5
5,345,223 * 9/1994 Ruthiewicz .......................... 340/581
5,485,747 * 1/1996 Antikainen et al. .............. 73/335.03
5,511,417 * 4/1996 Paukkunen ........................ 73/335.03
5,521,584 * 5/1996 Ortolano et al. ..................... 340/581
5,585,559 * 12/1996 Hata ................................. 73/335.02
5,614,671 * 3/1997 Morrissey .......................... 73/335.05
5,652,382 * 7/1997 Nakagawa et al. ............... 73/335.02
5,934,617 * 8/1999 Rutherford ....................... 244/134 E
6,073,480 * 6/2000 Gokhfeld ............................ 73/29.02

FOREIGN PATENT DOCUMENTS 560 941 A 4/1975 (CH) .
25 14 489 A 10/1976 (DE) .
40 32 734 C 1/1992 (DE) .

* cited by examiner

*Primary Examiner*—Hezron Williams
*Assistant Examiner*—David J. Wiggins
(74) *Attorney, Agent, or Firm*—Blakely Sokoloff Taylor & Zafman

(57) ABSTRACT

A device for detecting snow and ice which has a humidity sensor and an ambient temperature sensor. An evaluator switch is controlled according to a humidity sensor-measured variable, producing a control signal at set humidity values for defrosting a surface which is being monitored for snow and ice. The ambient temperature sensor activates the humidity sensor within a temperature range of between +2° C. and −12° C. The humidity sensor itself has a PTC (positive temperature coefficient) heating element. The current consumption of the heating element is used as a measure of humidity. Both the ambient temperature sensor and the humidity sensor are positioned at a mutual distance in a longitudinally extended sensor cartridge made of plastic. The temperature sensor is thermally decoupled from the PTC heating element. The PTC heating element is built into a metal sleeve in such a way that it is corrosion and humidity proof.

18 Claims, 2 Drawing Sheets

Figure 1:
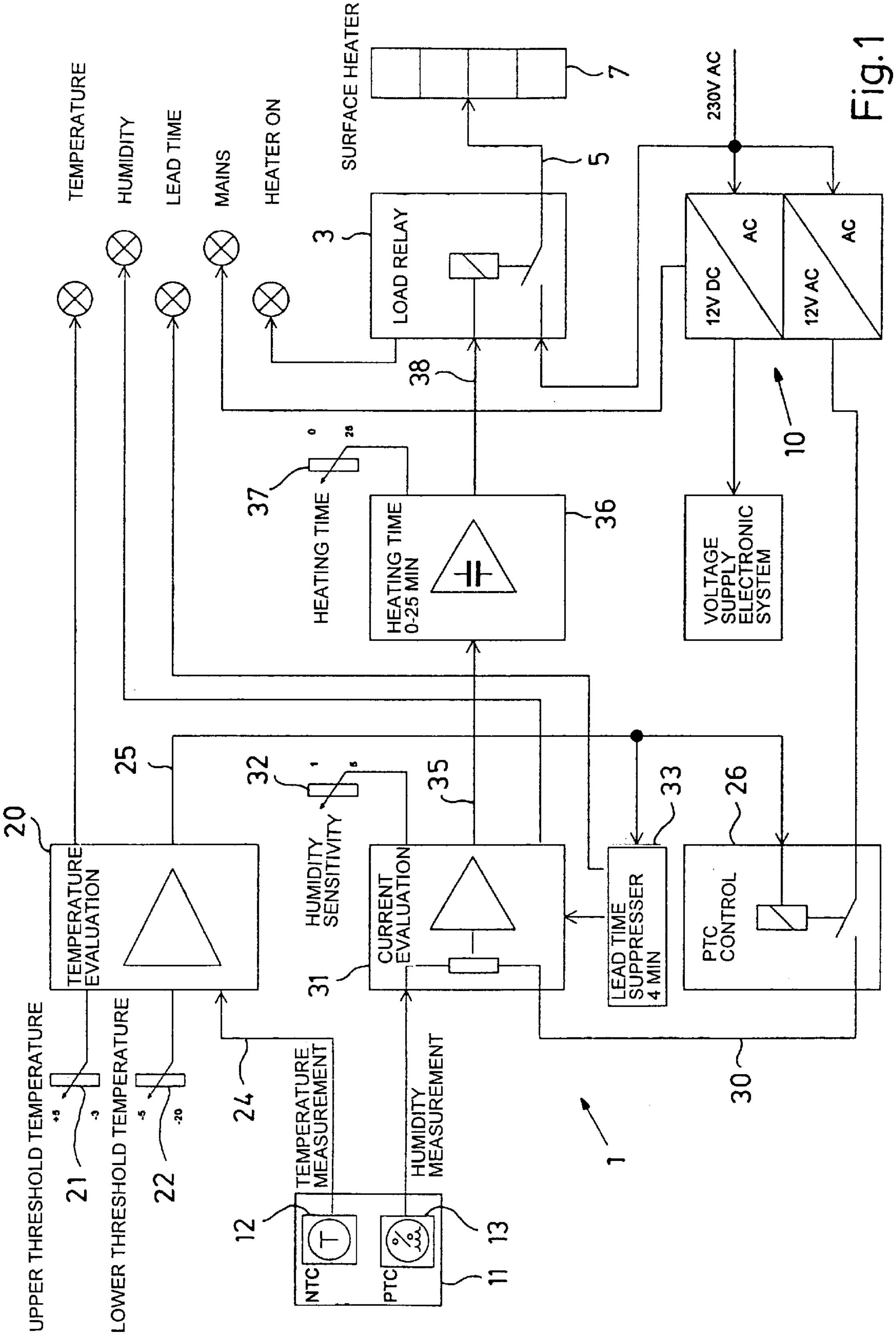

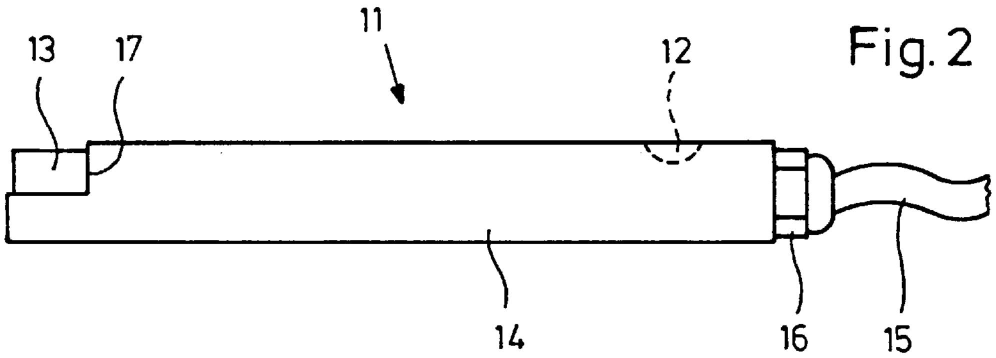
Fig. 2
Fig. A
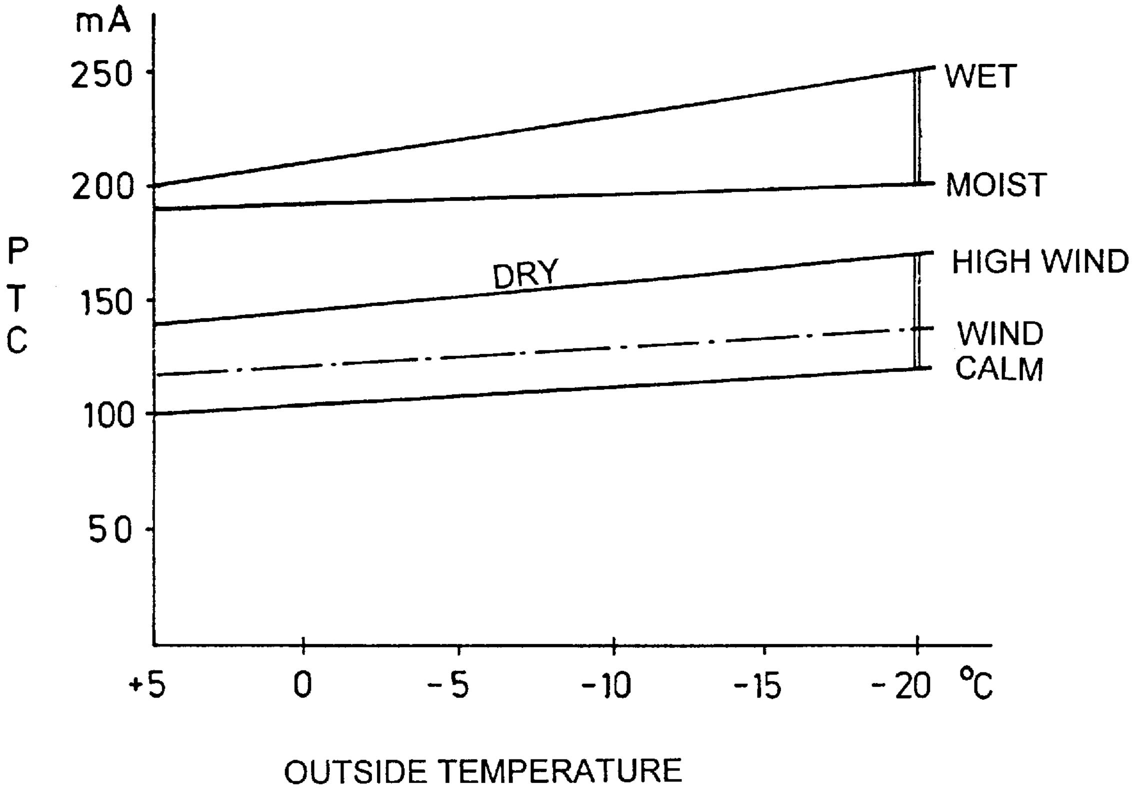

DEVICE AND METHOD FOR DETECTING SNOW AND ICE

The invention relates to a device for detecting snow and ice including a humidity sensor, with which a heating current circuit is associated, and an evaluation circuit controlled in dependence on a humidity sensor—measured variable which produces a switching and/or control signal at predetermined humidity values. The invention further relates to a method of operating the snow and ice detecting device.

DE 4032734 C1 discloses a snow and ice detecting device for controlling a heating system. This device prevents the formation of snow and ice on limited roadway regions, road ramps or roofs. Humidity is determined by means of at least two exposed electrodes by measuring a electrical resistance between the electrode arrangement and humidity is indicated when the resistance falls below a predetermined value. Since water is non-conductive in the solid aggregate state (in the form of ice or snow), a heating element had to be provided in or on the humidity electrodes in this known humidity sensor arrangement in order that an adjacent layer of ice and snow is melted and converted into electrically conductive water. In addition to the humidity sensor, a temperature sensor, which detects the ambient or surface temperature, is necessary. If the humidity sensor produces a humidity signal after the temperature value has fallen below a "critical" value (near to 0° C.), the switching or control signal is produced and the associated heating system switched on since the formation of snow or ice can be inferred. This known device is characterised by a high precision and has proved satisfactory in practice. It was, however, previously not readily possible to protect the metallic humidity electrodes, which are constantly exposed to environmental influences, from corrosion, contamination and/or short circuits from the exterior. The operational reliability of the known ice and snow detector therefore depends on periodic maintenance and cleaning work. Such work can only be performed, under certain circumstances, by experienced personnel and is expensive, particularly if it is relatively difficult to gain access to the humidity sensor, for instance in a roof gutter. It is also not easy to provide a sealed encapsulation of the electrical components of the known humidity sensor since the metallic electrodes must be exposed.

It is the object of the invention to provide a snow and ice detecting device in which reliable functioning is ensured with significantly reduced maintenance expense and low manufacturing expense.

Starting from a snow and ice detecting device of the type referred to above, this object is solved in accordance with the invention if an ambient temperature sensor is arranged in a control circuit which activates the humidity sensor when a temperature within a predetermined temperature range is detected; if the humidity sensor has a PTC heating element whose operating state with a resultant electrical current consumption is used as an indicator of the humidity; and if the two sensors are mutually spaced within an elongate sensor cartridge such that the temperature sensor is thermally decoupled from the PTC heating element.

The invention starts from the usage of a humidity sensor with maintenance-intensive, exposed humidity electrodes. In order to measure humidity, the invention uses the temperature-dependent current consumption of a PTC (positive temperature coefficient) resistance or heating element. This PTC heating element may be manufactured very economically in the form of a pill which is inserted into a good thermally conductive capsule, for instance a sleeve of metal or glass. The current consumption of a PTC heating element or resistance is dependent not only on its environmental temperature but also on its energy dissipation to the environment. It is known that the heat transfer between solid bodies and gaseous media is significantly worse than that between solid bodies and liquid media. The heat abstraction from the PTC heating element by air (when the sensor is dry) is significantly worse than by a damp or even liquid ambient atmosphere. The diagram of Figure A was plotted in an ambient temperature window between +5° C. and −20° C. with the humidity sensor including a PTC heating element used in accordance with the invention. At an operating voltage of 12V, the following currents were recorded.

| | |
|---|---|
| Sensor dry, wind calm | 100 . . . 120 mA |
| Sensor dry, high wind | 140 . . . 170 mA |
| / | |
| Sensor damp | 190 . . . 200 mA |
| Sensor very wet | 200 . . . 250 mA. |

These relatively unmistakable differences in the current consumption of the PTC sensor influenced by the ambient conditions may be detected reliably and without difficulty. The evaluation can then distinguish unambiguously between a dry sensor and a moist sensor. The system operates practically without maintenance as a result of the complete encapsulation of the new PTC sensor and the low current consumption values.

A considerable advantage of the invention also resides in the particular construction of the overall sensor combination in an elongate sensor cartridge. The sensor cartridge has small dimensions overall and may be installed without difficulty at a suitable position in the zone in which the formation of snow and ice is to be monitored. The humidity sensor is always disposed in the so-called distal region of the elongate sensor cartridge whilst the ambient temperature sensor is spaced from the humidity sensor and is thermally decoupled. The heating action of the PTC heating element does not influence the ambient temperature detection of the temperature sensor; the two sensors may nevertheless be combined into a compact unit in the sensor cartridge.

Precisely because of the compact construction of the sensor cartridge and its maintenance-free operation, expanded fields of application are produced for the new ice detecting device. These include roof gutters which are accessible with difficulty, roofs, antennae arrangements, which are to be maintained free of ice and snow, particularly parabolic mirrors, external doors and roadway coverings, road ramps, approaches to houses and the like.

In a preferred embodiment of the invention the sensor cartridge is constructed in the form of a plastic tube, arranged on one end of which there is a cable entry and in whose opposite end region the PTC heating element is arranged in a thermally conductive metal or glass sleeve. At its distal end the plastic tube has an opening at which the good thermally conductive sleeve or shell of the PTC heating element is exposed to the environment and offers the possibility of dissipating heat. The ambient temperature sensor is arranged close to the cable entry, that is to say remote from the PTC heating element, in the plastic tube.

A heating device for thawing purposes is generally controlled with the switching and/or control signal from the snow and ice detecting device in accordance with the invention. It can be installed, for instance, in a roof and ensure that the roof is reliably kept free of relatively large amounts of snow. The advantage of such a roof heater, in addition to avoiding dangerous falls of ice and snow from the roof, is the possibility of constantly deloading the roof construction and thus of a lighter and cheaper roof construction.

The control circuit, which acts in dependence on the ambient temperature, closes the measuring current circuit of the humidity sensor in a preferred embodiment of the invention. The humidity sensor is thus only powered when the ambient temperature is in a critical range close to 0° C., that is to say when there is some danger of snow and ice forming. After switching on the current to the PTC heating element, the latter initially has a very high current consumption substantially independent of humidity. In an advantageous embodiment of the invention, during this first phase a lead time suppresser is operative which is activated by the control circuit and blocks the production of the switching and/or control signal for a predetermined period of time until the PTC heating element has reached a steady operating state.

The temperature windows of both the ambient temperature sensor and also of the humidity sensor are preferably adjustable.

The method of detecting snow and ice in accordance with the invention uses the snow and ice detecting device described above and is characterised in accordance with the invention by the characterising features of claim 12.

Other advantageous embodiments of the invention are characterised in the dependent claims.

The invention will be explained in more detail below with reference to an exemplary embodiment shown in the drawings, in which:

FIG. 1 is a block circuit diagram with the electric components of an exemplary embodiment of the snow and ice detecting device in accordance with the invention; and FIG. 2 is a schematic side view of an exemplary embodiment of a sensor cartridge for the snow and ice detecting device shown in FIG. 1.

FIG. A indicates a graphical relationship between changes in PTC sensor output and observed operating conditions.

The block circuit diagram of FIG. 1 shows an exemplary embodiment of the snow and ice detecting device in accordance with the invention. In the illustrated exemplary embodiment, the device 1 serves to activate a load relay 3. When activated, the latter closes the operating current circuit 5 of a heating device, for instance a surface heater which thaws a roof or a roof gutter or a frozen pipe. The heating device is supplied from a mains current source which also supplies an operating current source 10 for the snow and ice detecting device 1. As may be seen, the operating voltage produced by the operating current source is a low voltage of 12V AC or DC.

As important component of the new snow and ice detecting device 1 is a sensor arrangement 11 with an ambient temperature sensor 12 and a humidity sensor 13 constructed in the form of a PTC heating element or resistance. The construction of the sensor arrangement will be described below with reference to FIG. 2.

The sensor arrangement 11 is installed in an elongate, tubular sensor cartridge 14. The sensor cartridge 14 comprises a poorly thermally conductive material, preferably plastic material. A connecting cable 15 extends into the interior of the sensor cartridge 14 at one end of the tube via a cable inlet 16. The ambient temperature sensor is constructed in the form of a PTC resistance and arranged at the end region of the sensor cartridge 14 adjacent to the cable inlet 16 such that it can relatively rapidly and precisely detect the ambient temperature through its thin walls. The humidity sensor 13, constructed in the form of a PTC heating element, is arranged at the end of the elongate sensor cartridge 14 opposite to the cable inlet 16 at such a spacing from the ambient temperature sensor 12 that the latter is uninfluenced by the heat energy from the PTC heating element, that is to say is thermally decoupled from the heating element, The PTC heating element is disposed in a moisture-tight manner in a metal or glass sleeve. The latter is exposed to the exterior through a window-like opening 17 in the plastic tube 14. The heat produced by the PTC heating element in the activated state of the humidity sensor can thus be conducted away to the surroundings through the metal or glass sleeve accommodating the heating element without substantial transmission losses.

The measurement of ambient temperature by the temperature sensor 12 is the primary measured and control value in the described ice and snow detecting device 1. Only when the ambient temperature falls below a "critical" value close to 0° C. is there any danger of snow and ice forming. It can, however, also be assumed that no further ice formation takes place below a very low temperature, which, in the described exemplary embodiment, lies within a setting range of −5° C. to −20° C. A temperature evaluation device is provided in the described exemplary embodiment with two adjustable threshold value setters 21 and 22, of which one is used to adjust an upper threshold temperature between −3° C. and +5° C. and the other 22 is used to adjust a lower threshold temperature between −20° C. and −5° C. The ambient temperature signal is supplied to the temperature evaluation device 20 via a line 21 and compared with the temperature window set at 21 and 22. Outside the temperature window the temperature evaluation device 20 remains inactive. The PTC heating element 13 constituting the humidity sensor remains switched off so long as the ambient temperature is below the set temperature window and there is no switching signal at the outlet 25 of the temperature evaluation device 20.

When the ambient temperature falls below the upper threshold temperature set by the threshold setter 21 and lies within the preset temperature window, the temperature evaluation device 20 produces a switching signal on the line 25. This switching signal closes, via a PTC control switch 26, the operating current circuit 30 of the PTC heating element which immediately begins to heat up. The current taken by the PTC heating element can be detected by means of a current evaluation device 31 and made use of as an indicator of the humidity in the vicinity of the humidity sensor 13, having regard to the diagram of FIG. A. During an initial transient phase the current taken by the PTC heating element is not a reproducible indicator of the humidity in the surroundings of the PTC sensor 13. In order to avoid false measurements or distortions, a lead time suppresser 33 is therefore provided in the described exemplary embodiment shown in FIG. 1, which is activated by the signal on the line 25 and is coupled to the current evaluation device 31 and suppresses the latter for a predetermined time after the production of the signal on line 25. Tests have shown that the PTC heating element reaches its steady operating state in a period of time of 3 to 5 min., generally after 4 min. at the latest. The lead time suppresser 33 is thus set in the described exemplary embodiment to 4 minutes. Thereafter, the current absorption is a reliable indicator of humid or dry environmental conditions.

The humidity sensitivity of the current evaluation device 31 can be adjusted with the aid of a control element 32.

In the steady state of the PTC heating element 13 its current absorption is characteristic of a dry or humid environment of the moisture sensor. If a high current absorption is detected (>190 mA in the described exemplary embodiment), the evaluation device 31 generates a switching and/or control signal on the output line 35. The load relay 3 and thus the surface heater 7 is activated with this switching or control signal. Arranged between the outlet of the current evaluation device 31 and the control inlet 38 of the load relay 3 is a holding circuit 36, with the aid of which the control input 38 of the load relay 3 is held in the activated state for an adjustable minimum time as soon as a switching or control signal is present at the output of the current evaluation device 31. As a result, even a short control pulse over the line 35 results in a preset control period of the control input 38 and thus to a corresponding heating time of the surface heater 7. This heating time can be input by way of a suitable heating time setter 37 in the holding circuit 36.

In the described exemplary embodiment, indicating means in the form of light emitting diodes are connected to the temperature and current evaluation devices 20 and 31, and also to the load relay 3, the lead time suppresser 33 and the operating current source 10, which indicate activation of the associated components. The temperature indicator lights up when the ambient temperature lies in the temperature range preset by the threshold value setters. The humidity indicator lights up when a switching or control signal is generated on the line 35. The lead time indicator lights up so long as the lead time suppresser is active. The mains indicator indicates operational readiness of the entire system and the heater indicator indicates activation of the load relay 3 and thus of the surface heater 7.

As a result of the compact construction and the relatively insensitive configuration of the sensor arrangement 11 the detection of the measured values can be performed even at difficultly accessible positions, such as in roof gutters or in the vicinity of high antennae or parabolic mirrors. The sensor arrangement requires practically no maintenance since the sensor connections and electric components are encapsulated in a moisture-tight and corrosion free manner. The current consumption of the temperature sensor is extremely low; the PTC sensor 13 also has a low energy consumption and is only switched on when there is a possibility of the formation of snow and ice.

What is claimed is:

1. Device for detecting snow and ice including a humidity sensor mounted in a peripheral environment for determining a humidity in a surrounding atmosphere subject to exposure by any of a snow precipitation, an ice formation and a water-vapor containing air with which a heating current circuit is associated, and an evaluation circuit controlled in dependence on a humidity sensor-measured variable, which produces a switching and/or control signal at predetermined humidity values, characterized in that an ambient temperature sensor is arranged in a control circuit which activates the humidity sensor when a temperature within a predetermined temperature range is detected; that the humidity sensor has a PTC (Positive Temperature Coefficient) resistance or heating element whose operating state with an electrical current consumption changes depending upon an ambient temperature change and an energy dissipation loss to said environment and atmosphere, which electrical current consumption is monitored by an electrical measuring current circuit and is used as an indicator of the humidity; and that the two sensors are mutually spaced within an elongate sensor cartridge such that the temperature sensor is thermally decoupled from the PTC heating element.

2. Device as claimed in claim 1, characterised in that the sensor cartridge is constructed in the form of a plastic tube, arranged on one end of which there is a cable entry and in whose opposite end region the PTC heating element is arranged in a metal or glass sleeve.

3. Device as claimed in claim 2, characterised in that the temperature sensor is arranged within the plastic tube near to the cable entry and remote from the PTC heating element.

4. Device as claimed in one of claims 1 to 3, characterised in that the control circuit controls a switch which closes the measuring current circuit of the humidity sensor.

5. Device as claimed in one of claims 1 to 3, characterised in that a current consumer with a threshold value setter is associated with the measuring current circuit and when the current consumption of the PTC heating element exceeds the threshold value the switching and/or control signal may be triggered.

6. Device as claimed in claim 5, characterised in that connected after the current consumer there is an adjustable time setter which holds the switching and/or control signal for a preset period of time.

7. Device as claimed in claim 1, characterised in that the switching and/or control signal controls a heating device for thawing purposes, by way of a switch, which is preferably constructed as a load relay, and/or warning device.

8. Device as claimed in claim 1, characterised in that the control circuit additionally activates a lead time suppresser which suppresses the release of the switching and/or control signal for a predetermined period of time until the PTC heating element has reached a steady operational state.

9. Device as claimed in claim 1, characterised in that the ambient temperature sensor with an associated output circuit is used to monitor a device response temperature alert zone, which said temperature sensor with said output circuit has means for adjusting an upper and/or lower threshold temperature and that the humidity sensor may be activated when the temperature falls below an upper threshold value.

10. Device as claimed in one of claims 1 to 9, characterised in that visual indicating means are coupled to an output of at least the control circuit and the evaluation circuit.

11. Device as claimed in claim 10, characterised in that visual indicating means are additionally coupled to an operating current source and to a heater controller.

12. Method for detecting snow and ice using a device as claimed in claim 1, characterised in that a humidity sensor including a PTC heating element, an electrical heating current circuit and an ambient temperature sensor are arranged mutually spaced and thermally decoupled in an elongate sensor cartridge, that is connected to receive electrical power from a mains voltage and an operating current source, while the sensor cartridge is immersed in a monitored zone at risk of snow and ice, whereby the ambient temperature sensor detects the ambient temperature, that the electrical heating current circuit of the PTC heating element is activated in dependence on the temperature falling below a preset threshold value; and that a measured drawn current in the heating current circuit of the PTC humidity sensor is sensed and a switching and/or control signal is triggered when the electrical current exceeds a predetermined threshold value.

13. Method as claimed in claim 12, characterised in that a temperature window is set between +5° C. and −20° C. and the heating current circuit of the PTC heating element is activated only within this window.

14. Method as claimed in claim 12 or 13, characterised in that a heating device in the form of a surface heater, which heats a roof, one or more roof gutters and/or one or more parabolic mirrors, or a warning signal is activated with the switching and/or control signal.

15. Method as claimed in claim 14, characterised in that a minimum activation time of the surface heater is preset.

16. Method as claimed in claim 1, characterised in that the electrical current flowing through the PTC heating element is measured and the switching and/or control signal is triggered, when the humidity sensor is activated, in dependence on making a comparison of whether said current flowing through said PTC heating elements exceeds a current strength threshold value.

17. Method as claimed in claim 1, characterised in that when the temperature falls below an upper threshold value a lead time suppresser is triggered with which the output of the switching and/or control signal is suppressed for a predetermined time until the temperature or current consumption of the PTC heating element is able to reach an operational equilibrium in a steady state.

18. Method as claimed in claim 1, characterised in that a set of operational states of the ambient temperature sensor and/or the humidity sensor and/or a heater and/or a lead time suppressor and the presence of the mains voltage are indicated visually to either a local or remote observer.

* * * * *